(12) United States Patent
Duch et al.

(10) Patent No.: US 11,326,646 B2
(45) Date of Patent: May 10, 2022

(54) DETECTION DEVICE FOR WHEEL HUB ASSEMBLY

(71) Applicant: Aktiebolaget SKF, Gothenburg (SE)

(72) Inventors: Daniele Duch, San Gillio (IT); Marco Gemello, Nichelino (IT); Aurelien Mesnager, Saint Mesme (FR)

(73) Assignee: Aktiebolaget SKF

( * ) Notice: Subject to any disclaimer, the term of this patent is extended or adjusted under 35 U.S.C. 154(b) by 0 days.

(21) Appl. No.: 16/678,883

(22) Filed: Nov. 8, 2019

(65) Prior Publication Data
US 2020/0148001 A1    May 14, 2020

(30) Foreign Application Priority Data

Nov. 9, 2018  (IT) .................. 102018000010206

(51) Int. Cl.
| | | |
|---|---|---|
| *F16C 41/00* | (2006.01) | |
| *B60B 27/00* | (2006.01) | |
| *F16C 33/80* | (2006.01) | |

(52) U.S. Cl.
CPC ........ *F16C 41/007* (2013.01); *B60B 27/0068* (2013.01); *B60B 27/0073* (2013.01); *F16C 33/805* (2013.01); *B60B 27/001* (2013.01)

(58) Field of Classification Search
CPC .. F16C 41/007; F16C 33/805; B60B 27/0005; B60B 27/0068; B60B 27/0073; B60B 27/001; G01P 3/487
See application file for complete search history.

(56) References Cited

U.S. PATENT DOCUMENTS

| | | | | |
|---|---|---|---|---|
| 4,795,278 A | * | 1/1989 | Hayashi | .............. B60B 27/0068 310/155 |
| 5,640,087 A | * | 6/1997 | Alff | ......................... F16C 33/78 324/173 |
| 6,186,667 B1 | * | 2/2001 | Nakamura | ............ F16C 19/185 384/448 |
| 2001/0000713 A1 | | 5/2001 | Nakamura et al. | |
| 2006/0170414 A1 | * | 8/2006 | Vignotto | ............... F16C 33/586 324/174 |

(Continued)

FOREIGN PATENT DOCUMENTS

| | | |
|---|---|---|
| DE | 102013203622 | 9/2014 |
| EP | 1598216 | 11/2005 |

(Continued)

OTHER PUBLICATIONS

Search Report for corresponding Italy Application No. 2018000010206 dated Sep. 27, 2019.

*Primary Examiner* — Alan B Waits
(74) *Attorney, Agent, or Firm* — Reed Smith LLP

(57) ABSTRACT

Detection device for a wheel hub assembly provided with a rolling bearing, the detection device having a phonic wheel made of magnetized material and mounted on a rotating ring of the bearing, a shaped support element angularly constrained to the rotating ring of the bearing arranged directly between the phonic wheel and the rotating ring so as to angularly lock together the phonic ring and the rotating ring, and a sensor facing the phonic wheel; a protection device being integral with the rotating ring of the bearing so as to protect simultaneously both the phonic wheel and the sensor from external contaminants.

6 Claims, 2 Drawing Sheets

(56) References Cited

U.S. PATENT DOCUMENTS

2008/0309322 A1 12/2008 Sentoku et al.
2018/0335442 A1 11/2018 Duch et al.

FOREIGN PATENT DOCUMENTS

| EP | 1672371 | 6/2006 |
| IT | 20160119368 | 5/2018 |
| JP | 2010159792 | 7/2010 |
| JP | 2012121390 | 6/2012 |

* cited by examiner

DETECTION DEVICE FOR WHEEL HUB ASSEMBLY

TECHNICAL FIELD OF THE INVENTION

The present invention relates to a detection device for a wheel hub assembly.

BACKGROUND

Speed detection devices such as phonic wheels include a cylindrical screen made of magnetized elastic material and a shaped support element which is angularly constrained to the rotating ring of a bearing.

SUMMARY OF THE INVENTION

The object of the present invention is to provide a detection device for a wheel hub assembly which does not have the drawbacks described above.

According to the present invention a detection device for a wheel hub assembly having the characteristic features described in the accompanying claims is provided.

BRIEF DESCRIPTION OF THE DRAWINGS

The invention will now be described with reference to the attached drawings which illustrate a non-limiting example of embodiments thereof.

DETAILED DESCRIPTION

A speed detection devices in accordance with Italian patent application 102016000119368 filed in the name of the present applicant allow an axial position of a phonic wheel to be adjusted during assembly, compensating for any errors in alignment of the phonic wheel with respect to a sensor. However, such devices have been found to have drawbacks, in certain critical applications, due to the direct exposure of such a detection device to dust and contaminants.

Embodiments in accordance with this disclosure are particularly suitable in for wheel hub assemblies for vehicles which are provided with a rolling bearing in which a device for detecting a speed of rotation of a rotating ring of a bearing comprise a phonic wheel integral with a rotating ring and also a sensor. Such a sensor is typically a speed sensor capable of acquiring a signal generated by a phonic wheel thereby allowing monitoring of various kinematic operational parameters of such a wheel hub assembly. The description which follows refers, by way of example, to these specific applications but is intended to be generally applicable and not limited to such specific applications.

Figure 1:
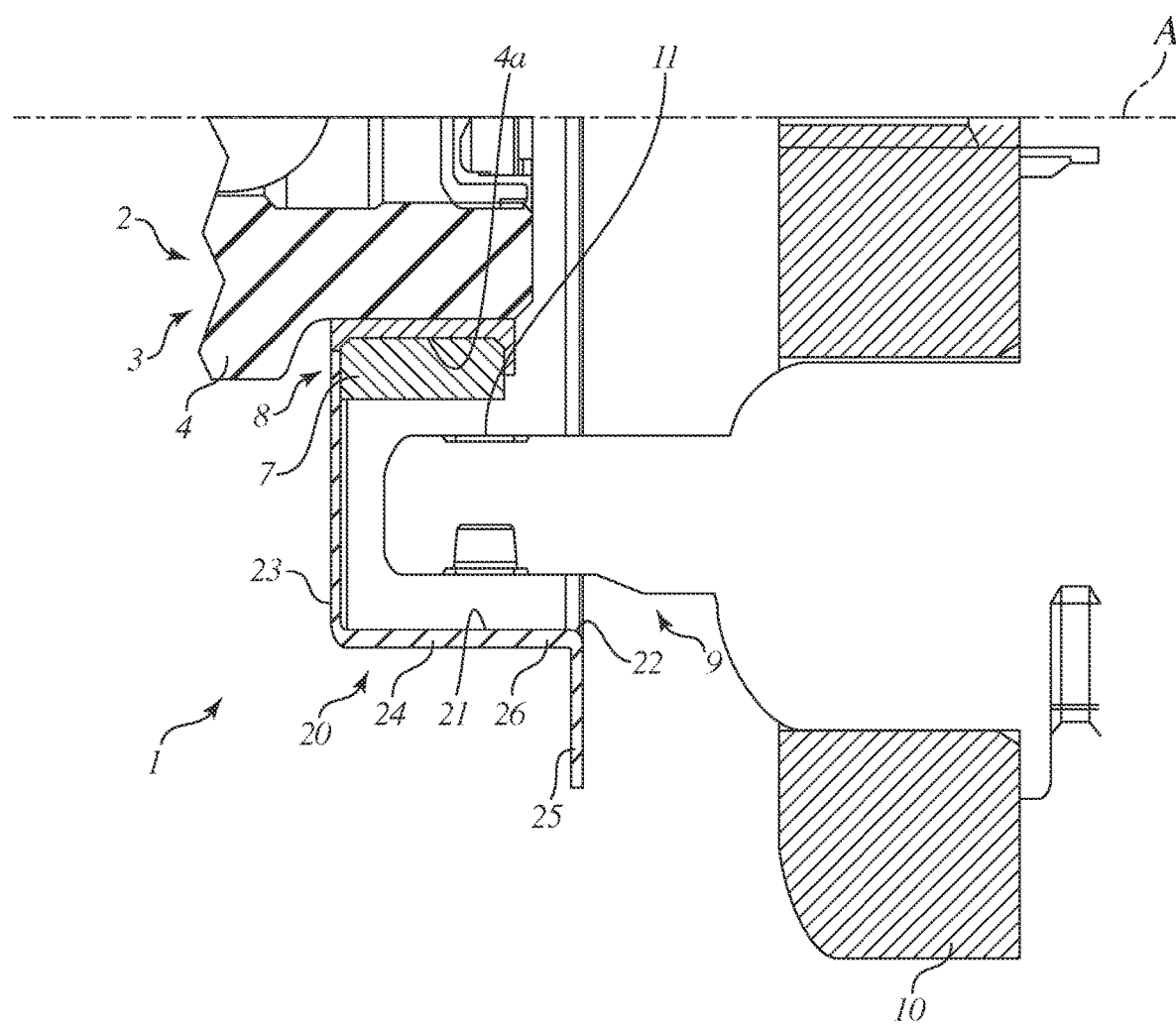
FIG. 1 shows a longitudinally sectioned view of preferred embodiments of a detection device in accordance with this disclosure.
Figure 2:
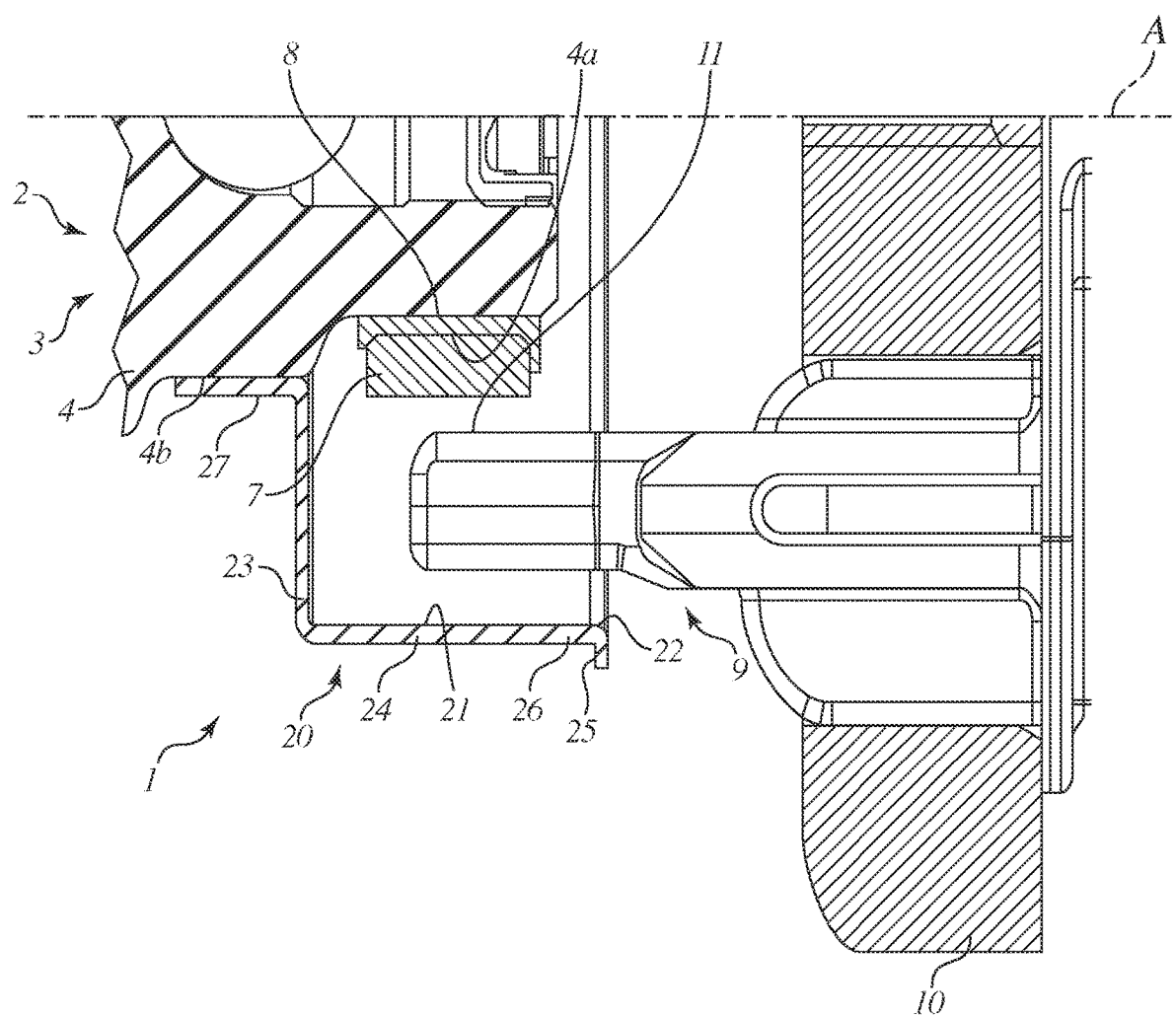
FIG. 2 shows a longitudinally sectioned view of preferred embodiments of a detection device for a wheel hub assembly in accordance with this disclosure.

FIG. 1 illustrates a speed detection device 1 for a wheel hub assembly 2. The assembly 2 is provided with a rolling bearing 3 comprising an outer ring 4 rotating about an axis A of rotation of the said bearing 3. Speed detection device 1 is configured to detect a speed of rotation of outer rotating ring 4 of bearing 3 and comprises. Speed detection device 1 may include a radial phonic wheel 7 integral with the ring 4. Speed detection device 1 may also include a shaped support 8 which is keyed onto the ring 4 so as to be angularly constrained to ring 4 and seats phonic wheel 7 so as to angularly lock together phonic wheel 7 and rotating ring 4. Speed detection device 1 may further include a sensor 9 radially facing the phonic wheel 7.

Phonic wheel 7 has a cylindrical body made preferably, but not necessarily, of ferromagnetic material and rotates angularly locked together with ring 4 and transmit a signal, depending on the rotation of said ring 4, to the sensor 9. Sensor 9, which is mounted on a stationary part 10 of a vehicle, protrudes axially from the stationary part 10 so as to radially face the phonic wheel 7, leaving between a cylindrical gap 11 with a given radial thickness between sensor 9 and photonic wheel 7.

Detection device 1 further includes a protection device 20, which is integral with the rotating ring 4 so as to protect simultaneously both phonic wheel 7 and sensor 9 from external contaminants. Protection device 20 includes a cylindrical annular seat 21 which has an annular opening 22 on the side where the sensor 9 is located so as to allow the introduction of said sensor 9 into seat 21. Sensor 9 is protected both axially, i.e., on an opposite side to of opening 22, and radially on the outside of the sensor 9 itself.

In accordance with this disclosure, protection device 20 may include a flanged axial protection screen 23 which is situated in a position axially facing the sensor 9 so as to axially protect sensor 9 and phonic wheel. Protection device 20 may also include a cylindrical protection screen 24 situated radially on the outside of the sensor 9 on the opposite side to the phonic wheel 7, radially on the outside of said phonic wheel 7 so as to protect radially sensor 9 and phonic wheel 7. Cylindrical screen 24 may radially bound opening 22, and may be adjacent to and integral with, on the opposite side to said opening 22, flanged screen 23 and may define, together with said flanged screen 23 and the rotating ring 4, annular seat 21.

Flanged screen 23 may be directed perpendicularly with respect to axis A, while a cylindrical screen 24 may be coaxial with the axis A and, together, may define seat 21 housing both phonic wheel 7 and sensor 9. Flanged screen 23 and cylindrical screen 24 thus protect both phonic wheel 7 and sensor 8 from contaminants, such as dust, water, mud, and grit which may come into contact with said wheel hub assembly 2, e.g., during use.

Protection device 20 further may comprise deflection and centrifuging screen 25 which may arranged on an axial end 26 of cylindrical screen 24. A centrifuging screen 25 extends radially outwards from said cylindrical screen 24 thereby shielding sensor 9 from any impurities which might come into contact with protection device 20, thus increasing the capacity of said protection device 20.

In some exemplary embodiments, a flanged screen 23 is made as one piece with a shaped support 8 and is mounted on a cylindrical surface 4a of ring 4 rotating together with shaped support 8. Thus, protection device 20 may be provided with a high degree of axial compactness and may be easily and quickly assembled together with bearing 3.

In some exemplary embodiments, flanged screen 23 is separate from and independent of shaped support 8 and is mounted on a cylindrical surface 4b of the rotating ring 4. For this purpose, protection device 20 may include a tubular mounting sleeve 27 integral with flanged screen 23 and extends axially on an opposite side to cylindrical screen 24 relative to flanged screen 23. Phonic wheel 7 and its support 8 may be mounted separately from protection device 20, allowing both retro-fitting, should wheel hub assembly 2 already be provided with a detection device 1 without protection for phonic wheel 7 and sensor 9, and a greater degree of flexibility during mounting.

It is understood that the invention is not limited to the exemplary embodiments described and illustrated here which, devices in accordance with this disclosure may instead be subject to further modifications as regards the forms and arrangements of parts as well as the constructional and assembly details.

The invention claimed is:

1. A detection device for a wheel hub assembly having a rolling bearing, comprising:
    a phonic wheel mounted on a rotating ring of a rolling bearing;
    a shaped support element angularly constrained to the rotating ring of the rolling bearing and arranged directly between the phonic wheel and the rotating ring, the phonic wheel and the rotating ring being angularly locked together;
    a sensor radially facing the phonic wheel;
    a means for protection integral with the rotating ring of the roller bearing;
    wherein the means for protection comprises:
        an annular seat having an opening open towards the sensor, wherein the means for protection is configured to protect the sensor both axially opposite to the opening and radially on radially opposite sides of the sensor;
        an axial protection screen placed for axially protecting the sensor and the phonic wheel; and
        a cylindrical protection screen integral with the axial protection screen, the cylindrical protection screen disposed in a second position radially on an outside of the sensor and the phonic wheel,
            wherein the cylindrical protection screen is on a radially opposite side of the annular seat from the phonic wheel, and
            wherein the cylindrical protection screen extends in an axial direction a greater distance than the shaped support element.

2. The detection device of claim 1, wherein the means for protection simultaneously protects the phonic wheel and the sensor from external contaminants.

3. The detection device of claim 1, wherein the axial protection screen includes a flanged screen.

4. The detection device of claim 1, wherein the means for protection further comprises a means for deflecting and centrifuging.

5. The detection device of claim 4, wherein the axial protection screen includes a flanged screen mounted integral on the rotating ring of the roller bearing.

6. A detection device for a wheel hub assembly having a rolling bearing, comprising:
    a phonic wheel made of magnetized material and mounted on a rotating ring of a rolling bearing;
    a shaped support element angularly constrained to the rotating ring of the rolling bearing and arranged directly between the phonic wheel and the rotating ring, the phonic wheel and the rotating ring being angularly locked together; and
    a sensor radially facing the phonic wheel;
    wherein the detection device comprises a protection device integral with the rotating ring of the rolling bearing, and wherein the protection device is configured to simultaneously protect the phonic wheel and the sensor from external contaminants, further wherein the protection device comprises a cylindrical annular seat having an opening open towards the sensor, wherein the protection device is configured to protect the sensor both axially opposite to the opening and radially on radially opposite sides of said sensor, further wherein the protection device comprises:
    an axial protection screen placed in a first position axially in front of the sensor so as to axially protect the sensor and the phonic wheel; and
    a cylindrical protection screen integral with the axial protection screen in a second position radially on an outside of the sensor and the phonic wheel, wherein the cylindrical protection defines, together with the axial protection and the rotating ring, the annular seat, wherein the axial protection is defined by a flanged screen formed as one piece with the shaped support element, wherein the cylindrical protection screen is on a radially opposite side of the annular seat from the phonic wheel, and wherein the protection device comprises a centrifuging screen configured to shield impurities from the protection device, wherein the centrifuging screen is arranged on an axial end of the cylindrical protection screen;
    wherein the cylindrical protection screen extends in an axial direction a greater distance than the shaped support element.

* * * * *